US012593288B2

(12) United States Patent
Pehlke

(10) Patent No.: US 12,593,288 B2
(45) Date of Patent: Mar. 31, 2026

(54) UPLINK CARRIER AGGREGATION ARCHITECTURE WITH POWER CONTROL CIRCUIT

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 323 days.

(21) Appl. No.: 18/128,554

(22) Filed: Mar. 30, 2023

(65) Prior Publication Data

US 2023/0345383 A1 Oct. 26, 2023

Related U.S. Application Data

(60) Provisional application No. 63/327,020, filed on Apr. 4, 2022.

(51) Int. Cl.
H04W 52/34 (2009.01)
H04W 52/14 (2009.01)
H04W 52/16 (2009.01)

(52) U.S. Cl.
CPC ....... H04W 52/346 (2013.01); H04W 52/146 (2013.01); H04W 52/16 (2013.01)

(58) Field of Classification Search
CPC . H04W 52/346; H04W 52/146; H04W 52/16; H04W 52/34
See application file for complete search history.

(56) References Cited

U.S. PATENT DOCUMENTS

| | | | |
|---|---|---|---|
| 9,960,793 | B2 | 5/2018 | Anthony et al. |
| 10,498,521 | B2 | 12/2019 | Little |
| 10,629,979 | B2 | 4/2020 | Jayaraman et al. |
| 10,749,512 | B2 | 8/2020 | Balteanu |
| 10,944,523 | B2 * | 3/2021 | Pehlke ................. H04B 7/0413 |
| 2015/0065058 | A1 * | 3/2015 | Wang .................... H04B 15/00 455/63.1 |
| 2015/0133067 | A1 | 5/2015 | Chang et al. |
| 2015/0190075 | A1 | 7/2015 | Stafford |
| 2015/0233903 | A1 | 8/2015 | Zhang et al. |
| 2015/0295596 | A1 | 10/2015 | Wloczysiak et al. |
| 2015/0296515 | A1 | 10/2015 | Pehlivanoglu |
| 2016/0050665 | A1 | 2/2016 | Chang et al. |
| 2016/0065255 | A1 | 3/2016 | Domino |
| 2016/0127016 | A1 | 5/2016 | Pehlke et al. |

(Continued)

*Primary Examiner* — John J Lee

(74) *Attorney, Agent, or Firm* — Knobbe, Martens, Olson & Bear, LLP

(57) ABSTRACT

Embodiments of the invention relate to an uplink carrier aggregation architecture including a first signal path, a second signal path, a third signal path and a power control circuit. Signals in a first frequency band are transmitted and received via the first signal path. Signals in a second frequency band are received via the second signal path and transmitted via the third signal path. The power control circuit is configured to measure a first power level associated with the first frequency band and a second power level associated with the second frequency band at the first signal path. The power control circuit is further configured to adjust the power of a signal to be transmitted in the first frequency band and/or a signal to be transmitted in the second frequency band.

20 Claims, 11 Drawing Sheets

(56)　　　References Cited

U.S. PATENT DOCUMENTS

| | | |
|---|---|---|
| 2016/0172056 A1 | 6/2016 | Huh |
| 2017/0026060 A1 | 1/2017 | Thompson et al. |
| 2017/0048028 A1 | 2/2017 | Pehlke et al. |
| 2017/0093442 A1 | 3/2017 | Jayaraman et al. |
| 2017/0094607 A1 | 3/2017 | Ripley |
| 2017/0222665 A1 | 8/2017 | Chang et al. |
| 2017/0230068 A1 | 8/2017 | Domino |
| 2017/0244538 A1 | 8/2017 | Chang et al. |
| 2018/0019768 A1 | 1/2018 | King |
| 2018/0152945 A1 | 5/2018 | Balteanu |
| 2018/0309528 A1 | 10/2018 | King |
| 2018/0351628 A1 | 12/2018 | Wloczysiak |
| 2019/0007073 A1 | 1/2019 | King et al. |
| 2019/0028136 A1 | 1/2019 | Zhng et al. |
| 2019/0052291 A1 | 2/2019 | King |
| 2019/0074819 A1 | 3/2019 | Goto et al. |
| 2019/0097661 A1 | 3/2019 | Chang et al. |
| 2019/0123769 A1 | 4/2019 | Pehlke et al. |
| 2019/0123770 A1 | 4/2019 | Pehlke |
| 2019/0140677 A1 | 5/2019 | Pehlivanoglu |
| 2019/0149178 A1 | 5/2019 | King et al. |
| 2019/0190548 A1 | 6/2019 | Chang et al. |
| 2019/0215774 A1 | 7/2019 | Ripley |
| 2019/0260399 A1 | 8/2019 | Wloczysiak |
| 2019/0268027 A1 | 8/2019 | Wloczysiak et al. |
| 2019/0379409 A1 | 12/2019 | Thompson et al. |
| 2020/0106463 A1 | 4/2020 | Chang et al. |
| 2020/0154434 A1 | 5/2020 | Balteanu |
| 2020/0162114 A1 | 5/2020 | King et al. |
| 2020/0162209 A1 | 5/2020 | Pehlke et al. |
| 2020/0162229 A1 | 5/2020 | Chang et al. |
| 2020/0358460 A1 | 11/2020 | Wloczysiak et al. |
| 2020/0358516 A1 | 11/2020 | Wloczysiak |
| 2020/0389228 A1* | 12/2020 | Ashworth .......... H04B 7/15535 |
| 2021/0175910 A1 | 6/2021 | Jayaraman et al. |
| 2021/0175916 A1 | 6/2021 | Pehlivanoglu |
| 2021/0194511 A1 | 6/2021 | Chang et al. |
| 2021/0211984 A1 | 7/2021 | Ripley |
| 2021/0408984 A1 | 12/2021 | Arkiszewski et al. |
| 2022/0045833 A1 | 2/2022 | Chang et al. |
| 2022/0247478 A1 | 8/2022 | Wloczysiak |
| 2022/0328982 A1* | 10/2022 | Kim .................... H04B 1/0053 |
| 2023/0020586 A1 | 1/2023 | Kasnavi et al. |
| 2023/0088469 A1 | 3/2023 | Raghavan |

* cited by examiner

EPC 14 eNb 11 gNb 12

CONTROL PLANE

LTE(Tx$_1$/Rx$_1$)

NR(Tx$_2$/Rx$_2$)

10

RF1_IN

RF2_IN

40

UPLINK (UL)
CARRIER–AGGREGATION (CA)
SYSTEM

RF1_OUT

RF2_OUT

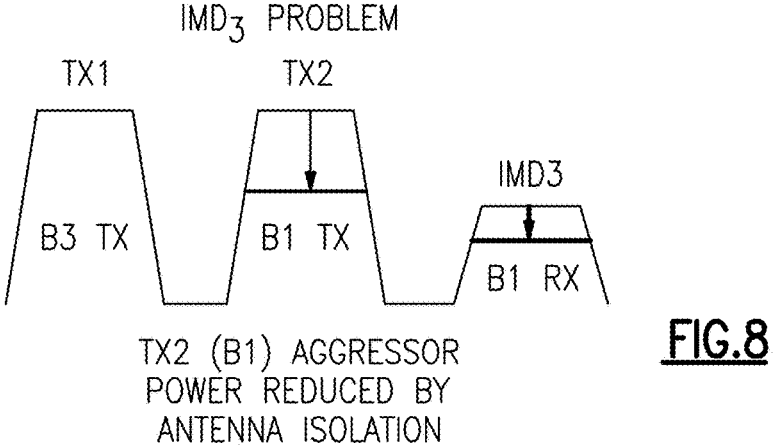
_FIG.7_
_FIG.8_
IMD₃ PROBLEM
TX2 (B1) AGGRESSOR
POWER REDUCED BY
ANTENNA ISOLATION

60

DETECT FORWARD POWER AT TX1
FREQUENCY AND REFLECTED POWER AT
TX2 FREQUENCY

62

DETERMINE IMD PERFORMANCE BASED
ON THE DETECTED FORWARD POWER AND
REFLECTED POWER

64

ADJUST THE TX1 POWER AND/OR THE
TX2 POWER TO PROVIDE TARGET IMD,
EMISSIONS AND RXDESENSE
PERFORMANCE

66

UPLINK CARRIER AGGREGATION ARCHITECTURE WITH POWER CONTROL CIRCUIT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to carrier aggregation. In particular, the present disclosure relates to an uplink (UL) carrier aggregation (CA) system.

Description of the Related Technology

In some wireless communication systems, such as E-UTRAN New Radio-Dual Connectivity systems (EN-DC), it may be desirable to support simultaneous transmitters being active at the same time. Supporting simultaneous active transmitters (at the same time) may allow for added features and capabilities such as simultaneous radio operation in a user equipment (UE).

In such systems, transmitting from two or more antennas at or near a front-end may be a challenge. For example, the amount of antenna-to-antenna isolation may vary significantly in different environments and, if not correctly accounted for, may limit the UL performance.

SUMMARY

According to one embodiment there is provided an uplink carrier aggregation architecture comprising a first signal path configured to transmit and receive signals in a first frequency band, a second signal path configured to receive signals in a second frequency band, a third signal path configured to transmit signals in the second frequency band, and a power control circuit coupled to the first signal path, the power control circuit being configured to measure a first power level associated with the first frequency band and a second power level associated with the second frequency band and to adjust the power of signals to be transmitted in the first frequency band and/or the second frequency band.

In one example the power control circuit comprises a power detector module configured to measure the power of the signal to be transmitted in the first frequency band and the power of the received signal in the second frequency band.

In one example the power control circuit comprises an adjustment module configured to adjust the power of the signals to be transmitted in the first frequency band and/or the second frequency band.

Another example further comprises a first adjustment module configured to adjust the power of the signals to be transmitted in the first frequency band and a second adjustment module configured to adjust the power of the signals to be transmitted in the second frequency band.

In one example the power control circuit comprises a first power amplifier that amplifies the signal to be transmitted in the first frequency band.

In one example the power control circuit comprises a first power amplifier that amplifies the signal to be transmitted in the first frequency band and a second power amplifier that amplifies the signal to be transmitted in the second frequency band.

In one example the power control circuit comprises a first power amplifier that amplifies the signal to be transmitted in the first frequency band and a second power amplifier that amplifies the signal to be transmitted in the second frequency band, the adjustment module being configured to adjust the power of the transmitted signals in the first frequency band and/or the second frequency band by adjusting a power level associated with the respective first or second power amplifier.

In one example the first signal path is coupled to a first antenna port via a diplexer.

In one example the second signal path is coupled to a first antenna port via a diplexer.

In one example the third signal path is coupled to a second antenna port.

In one example the first signal path includes a transmit path for processing signals in the first frequency band, the transmit path including a first power amplifier, a band select switch, a first duplexer, and an antenna switch module.

In one example the second signal path includes a receive path for processing signals in the second frequency band the receive path including a second duplexer, and the first antenna switch module.

In one example the third signal path includes a transmit path for processing signals in the second frequency band, the transmit path including a second power amplifier, a filter, and a second antenna switch module.

In one example the first frequency band is a first frequency division duplex radiofrequency band and the second frequency band is a second frequency division duplex radiofrequency band.

In one example the first frequency band includes frequency signals between approximately 1,710 MHz to 1,785 MHz and between approximately 1,805 MHz to 1,880 MHz.

In one example the second frequency band includes frequency signals between approximately 1,920 MHz to 1,980 MHz and between approximately 2,110 MHz to 2,170 MHz.

In one example the second frequency band includes frequency signals between approximately 1,850 MHz to 1,910 MHz and between approximately 1,930 MHz to 1,990 MHz.

In one example the second frequency band includes frequency signals between approximately 1,850 MHz to 1,915 MHz and between approximately 1,930 MHz to 1,995 MHz.

In one example the first power level associated with the first radiofrequency band is a power level of a transmitted signal in the first frequency band and the second power level associated with the second radiofrequency band is a power level of a received signal in the second frequency band.

According to another embodiment there is provided a radio-frequency front-end module comprising a packaging substrate configured to receive one or more components, and an uplink carrier aggregation architecture comprising a first signal path configured to transmit and receive signals in a first frequency band, a second signal path configured to receive signals in a second frequency band, a third signal path configured to transmit signals in the second frequency band, and a power control circuit coupled to the first signal path, the power control circuit being configured to measure a power of a transmitted signal in the first frequency band and a power of a received signal in the second frequency band and to adjust the power of signals to be transmitted in the first frequency band and/or the second frequency band.

According to another embodiment there is provided a wireless device comprising a first transceiver and a second transceiver, a first antenna and a second antenna, and a radio-frequency front-end module comprising a packaging substrate configured to receive one or more components and an uplink carrier aggregation architecture, the uplink carrier aggregation architecture comprising a first signal path configured to transmit and receive signals in a first frequency band, a second signal path configured to receive signals in a second frequency band, a third signal path configured to transmit signals in the second frequency band, and a power control circuit coupled to the first signal path, the power control circuit being configured to measure a power of a transmitted signal in the first frequency band and a power of a received signal in the second frequency band and to adjust the power of signals to be transmitted in the first frequency band and/or the second frequency band.

According to another embodiment there is provided a method of providing uplink carrier aggregation comprising measuring, with a power control circuit, a first power level associated with a first frequency band and a second power level associated with a second frequency band at a first signal path, determining, with the power control circuit, a calculated performance value based on the first power level and the second power level, comparing, with the power control circuit, the calculated performance value with a target performance value, adjusting, with the power control circuit, the power of signals to be transmitted in the first frequency band and/or the second frequency band.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 7 is a schematic diagram of a front-end architecture according to aspects of the present invention;

FIG. 8 is a diagram illustrating the effect of intermodulation distortion on two radiofrequency bands;

DETAILED DESCRIPTION

Figure 1:
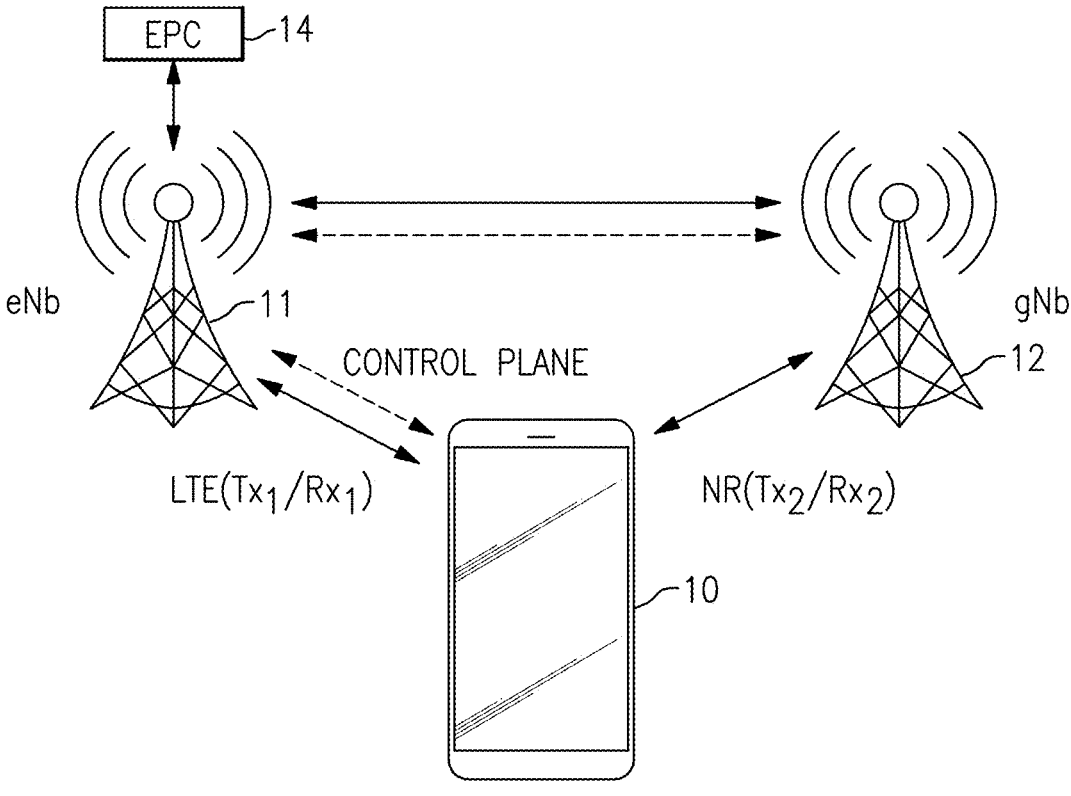
FIG. 1 is a schematic diagram of an example dual connectivity network topology.

Aspects and embodiments described herein are directed to an uplink carrier aggregation architecture having a power control circuit for measuring a first power level associated with the first frequency band and a second power level associated with the second frequency band and to adjust the power of signals to be transmitted in the first frequency band and/or the second frequency band. This advantageously enables a more accurate calculation of the intermodulation (IMD) caused by simultaneously transmitting two signals in different frequency bands, which enables the relative transmit powers of signals in the first and second frequency bands to be optimized to maximize the data rate of the uplink.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), fourth generation (4G) technology (for instance, Long Term Evolution (LTE) and LTE Advanced) and fifth generation (5G) technology, also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR Dual Connectivity.

With the introduction of the 5G NR air interface standards, 3GPP has allowed for the simultaneous operation of 5G and 4G standards in order to facilitate the transition. This mode can be referred to as Non-Stand-Alone (NSA) 5G operation or E-UTRAN New Radio-Dual Connectivity (ENDC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

FIG. 1 is a diagram of an example dual connectivity network topology. This architecture can leverage LTE legacy coverage to ensure continuity of service delivery and the progressive rollout of 5G cells. A UE 10 can simultaneously transmit dual uplink LTE and NR carrier. The UE 10 can transmit an uplink LTE carrier TX1 to the eNB 11 while transmitting an uplink NR carrier TX2 to the gNB 12 to implement dual connectivity. Any suitable combination of uplink carriers TX1, TX2 and/or downlink carriers RX1, RX2 can be concurrently transmitted via wireless links in the example network topology of FIG. 1. The eNB 11 can provide a connection with a core network, such as an Evolved Packet Core (EPC) 14. The gNB 12 can communicate with the core network via the eNB 11. Control plane data can be wireless communicated between the UE 10 and eNB 11. The eNB 11 can also communicate control plane data with the gNB 12. Control plane data can propagate along the paths of the dashed lines in FIG. 1. The solid lines in FIG. 1 are for data plane paths.

In the example dual connectivity topology of FIG. 1, any suitable combinations of standardized bands and radio access technologies (e.g., FDD, TDD, SUL, SDL) can be wirelessly transmitted and received. This can present technical challenges related to having multiple separate radios and bands functioning in the UE 10. With a TDD LTE anchor point, network operation may be synchronous, in which case the operating modes can be constrained to TX1/TX2 and RX1/RX2, or asynchronous which can involve TX1/TX2, TX1/RX2, RX1/TX2, RX1/RX2. When the LTE anchor is a frequency division duplex (FDD) carrier, the TDD/FDD inter-band operation can involve simultaneous transmit and receive operating modes such as TX1/RX1/TX2 and TX1/RX1/RX2.

Concurrent transmissions of any suitable combination of an LTE band transmission and an NR band transmission can be implemented. Any other suitable combination of concurrent transmissions associated with two different radio access technologies can be implemented in accordance with any suitable principles and advantages disclosed herein.

Although certain embodiments disclosed herein are related to dual connectivity operation, any suitable principles and advantages disclosed herein can be implemented in other applications where a plurality of radio frequency signals are being concurrently generated for transmission. For instance, any suitable combination of features described with reference to dual connectivity can be implemented in association with carrier aggregation. The carrier aggregation can be an uplink carrier aggregation. As another example, any suitable combination of features described with reference to dual connectivity can be implemented in association with multiple-input multiple-output (MIMO) communications. The MIMO communication can be an uplink MIMO communication.

Figure 2:
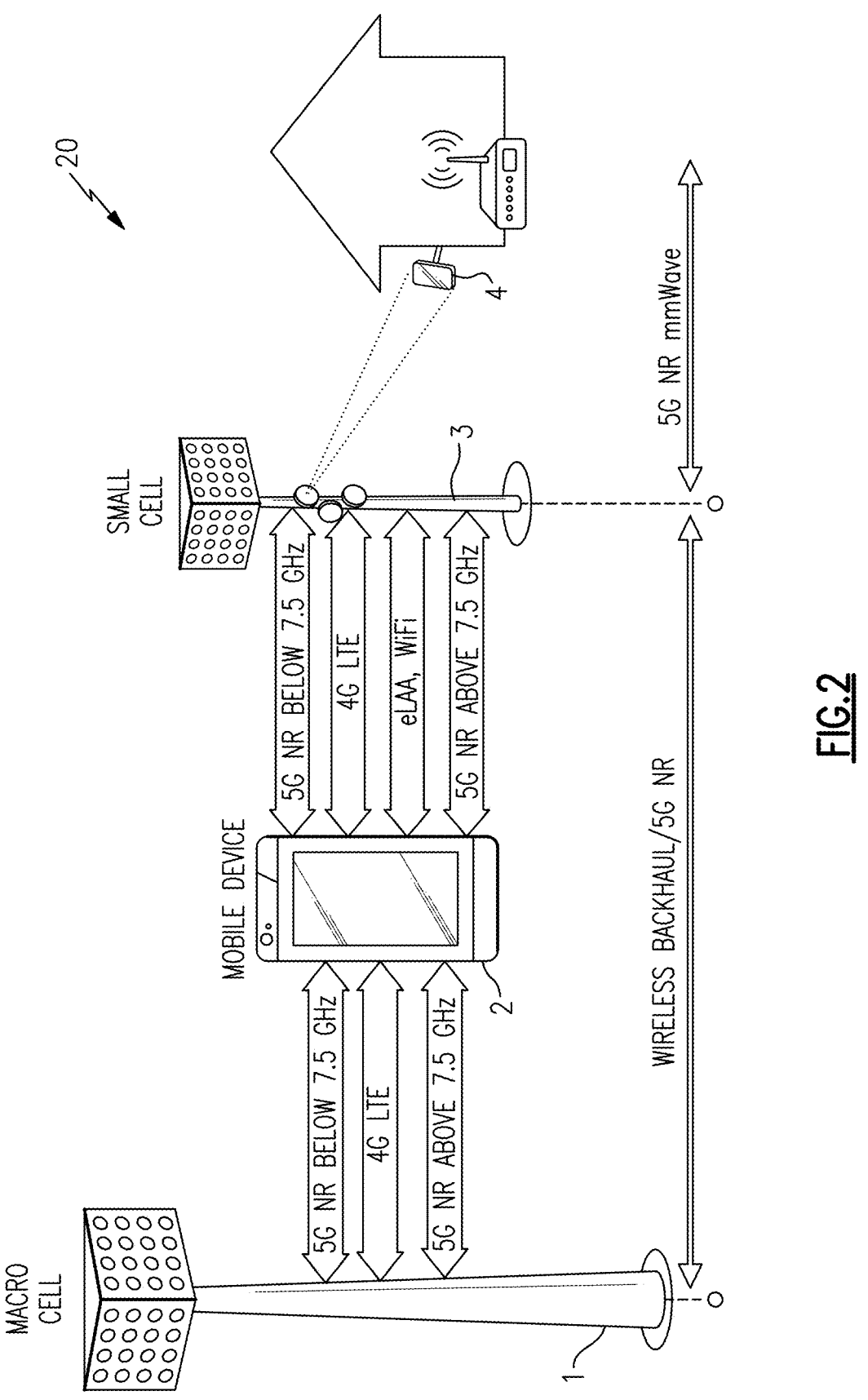
FIG. 2 is a schematic diagram of an example communication network.

FIG. 2 is a schematic diagram of one example of a communication network 20. The communication network 20 includes a macro cell base station 1, a mobile device 2, a small cell base station 3, and a stationary wireless device 4.

The illustrated communication network 20 of FIG. 2 supports communications using a variety of technologies, including, for example, 4G LTE, 5G NR, and wireless local area network (WLAN), such as Wi-Fi. In the communication network 20, dual connectivity can be implemented with concurrent 4G LTE and 5G NR communication with the mobile device 2. Although various examples of supported communication technologies are shown, the communication network 20 can be adapted to support a wide variety of communication technologies.

Various communication links of the communication network 20 have been depicted in FIG. 2. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 2, the mobile device 2 communicates with the macro cell base station 1 over a communication link that uses a combination of 4G LTE and 5G NR technologies. The mobile device 2 also communications with the small cell base station 3. In the illustrated example, the mobile device 2 and small cell base station 3 communicate over a communication link that uses 5G NR, 4G LTE, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

In certain implementations, the mobile device 2 communicates with the macro cell base station 2 and the small cell base station 3 using 5G NR technology over one or more frequency bands that are less than 7.5 Gigahertz (GHz) and/or over one or more frequency bands that are greater than 7.5 GHz. For example, wireless communications can utilize Frequency Range 1 (FR1), Frequency Range 2 (FR2), or a combination thereof. In one embodiment, the mobile device 2 supports a High Power User Equipment (HPUE) power class specification.

The illustrated small cell base station 3 also communicates with a stationary wireless device 4. The small cell base station 3 can be used, for example, to provide broadband service using 5G NR technology. In certain implementations, the small cell base station 3 communicates with the stationary wireless device 4 over one or more millimeter wave frequency bands in the frequency range of 30 GHz to 300 GHz and/or upper centimeter wave frequency bands in the frequency range of 24 GHz to 30 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 20 of FIG. 2 includes the macro cell base station 1 and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 20 is illustrated as including two base stations, the communication network 20 can be implemented to include more or fewer base stations and/or base stations of other types. As shown in FIG. 2, base stations can communicate with one another using wireless communications to provide a wireless backhaul. Additionally or alternatively, base stations can communicate with one another using wired and/or optical links.

The communication network 20 of FIG. 2 is illustrated as including one mobile device and one stationary wireless device. The mobile device 2 and the stationary wireless device 4 illustrate two examples of user devices or user equipment (UE). Although the communication network 20 is illustrated as including two user devices, the communication network 20 can be used to communicate with more or fewer user devices and/or user devices of other types. For example, user devices can include mobile phones, tablets, laptops, Internet of Things (IoT) devices, wearable electronics, and/or a wide variety of other communications devices.

User devices of the communication network 20 can share available network resources (for instance, available frequency spectrum) in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user device a unique code, space divisional multiple access (SDMA) in which beamforming is used to provide shared access by spatial division, and non-orthogonal multiple access (NOMA) in which the power domain is used for multiple access. For example, NOMA can be used to serve multiple user devices at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with IoT applications.

The communication network 20 of FIG. 2 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 3A:
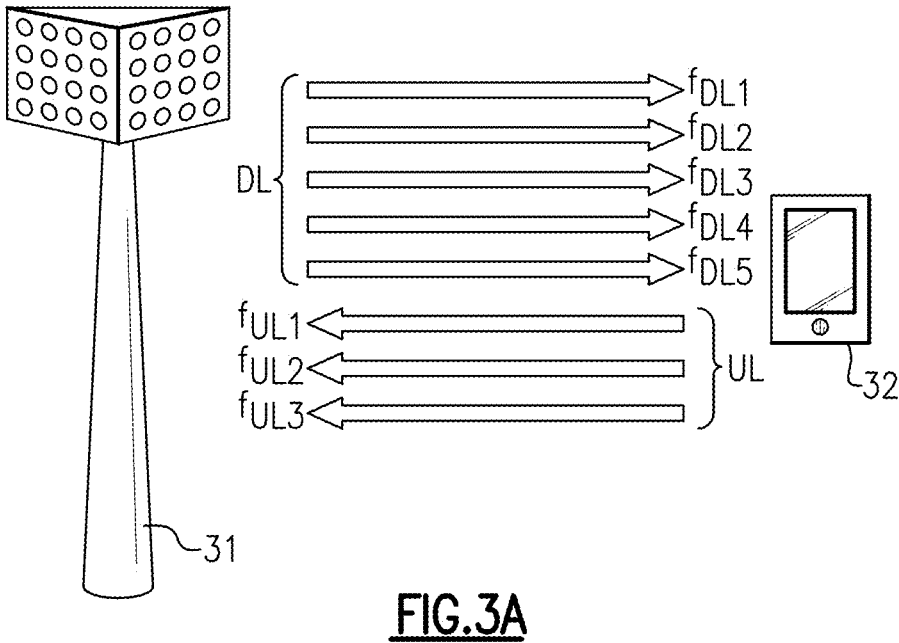
FIG. 3A is a schematic diagram of an example communication link using carrier aggregation.

FIG. 3A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 31 and a mobile device 32. As shown in FIG. 3A, the communications link includes a downlink channel used for RF communications from the base station 31 to the mobile device 32, and an uplink channel used for RF communications from the mobile device 32 to the base station 31.

Although FIG. 3A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 31 and the mobile device 32 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 3A, the uplink channel includes three aggregated component carriers f_UL1, f_UL2 and f_UL3. Additionally, the downlink channel includes five aggregated component carriers f_DL1, f_DL2, f_DL3, f_DL4 and f_DL5. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 3B:
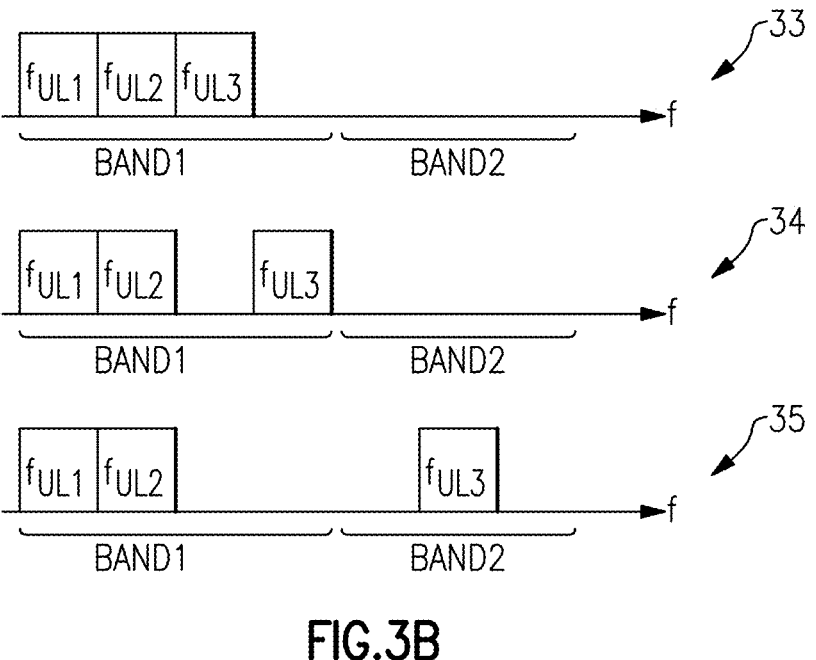
FIG. 3B is a schematic diagram of various examples of uplink carrier aggregation for the communication link shown in FIG. 3A.

FIG. 3B illustrates various examples of uplink carrier aggregation for the communication link of FIG. 3A. FIG. 3B includes a first carrier aggregation scenario 33, a second carrier aggregation scenario 34, and a third carrier aggregation scenario 35, which schematically depict three types of carrier aggregation.

The carrier aggregation scenarios 33-35 illustrate different spectrum allocations for a first component carrier f_UL1, and, a second component carrier f_UL2, and a third component carrier f_UL3. Although FIG. 3B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 33 illustrates intra-band contiguous carrier aggregation, in which component carriers that are adjacent in frequency and in a common frequency band are aggregated. For example, the first carrier aggregation scenario 33 depicts aggregation of component carriers f_UL1, f_UL2 and f_UL3 that are contiguous and located within a first frequency band BAND1.

With continuing reference to FIG. 3B, the second carrier aggregation scenario 34 illustrates intra-band noncontinuous carrier aggregation, in which two or more components carriers that are non-adjacent in frequency and within a common frequency band are aggregated. For example, the second carrier aggregation scenario 34 depicts aggregation of component carriers f_UL1, f_UL2 and f_UL3 that are non-contiguous, but located within a first frequency band BAND1.

The third carrier aggregation scenario 35 illustrates inter-band non-contiguous carrier aggregation, in which component carriers that are non-adjacent in frequency and in multiple frequency bands are aggregated. For example, the third carrier aggregation scenario 35 depicts aggregation of component carriers f_UL1 and f_UL2 of a first frequency band BAND1 with component carrier f_UL3 of a second frequency band BAND2.

With reference to FIGS. 3A-3B, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as Wi-Fi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid Wi-Fi users and/or to coexist with Wi-Fi users. Enhanced license assisted access (eLAA) refers to an evolution of LAA that aggregates licensed and unlicensed spectrum for both downlink and uplink.

Modern wireless communication systems, such as LTE, LTE-Advanced and 5G NR, include added features and capabilities such as simultaneous radio operation in a user equipment (UE) that make it necessary or desirable to support simultaneous transmitters being active at the same time. However, relatively high power signals from two or more TX carriers being routed and/or processed at or near a front-end can be a challenge. For example, various blocks in the TX and RX paths are somewhat nonlinear, and accordingly, intermodulation products at a range of frequencies can be created.

Figure 4:
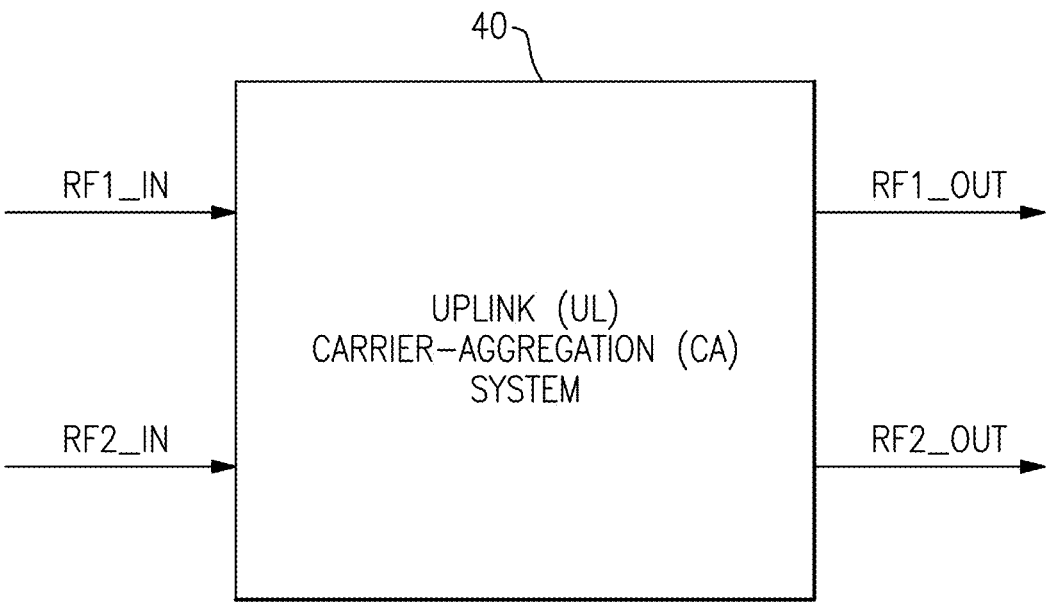
FIG. 4 is a schematic diagram of a first uplink carrier aggregation system according to aspects of the present invention.

FIG. 4 shows a schematic diagram of a UL CA system 40 that may be implemented within a mobile device and having one or more advantageous features as described herein. Such a UL CA system can be configured to process a plurality of radio-frequency (RF) signals (RF1_IN, RF2_IN) and route them to a plurality of antennas or antenna feeds as output signals RF1_OUT, RF2_OUT. Although the following examples are described in the context of UL CA of two bands, it will be appreciated that in some embodiments one or more features of the present disclosure can also be implemented in configurations involving more than two bands.

Figure 5:
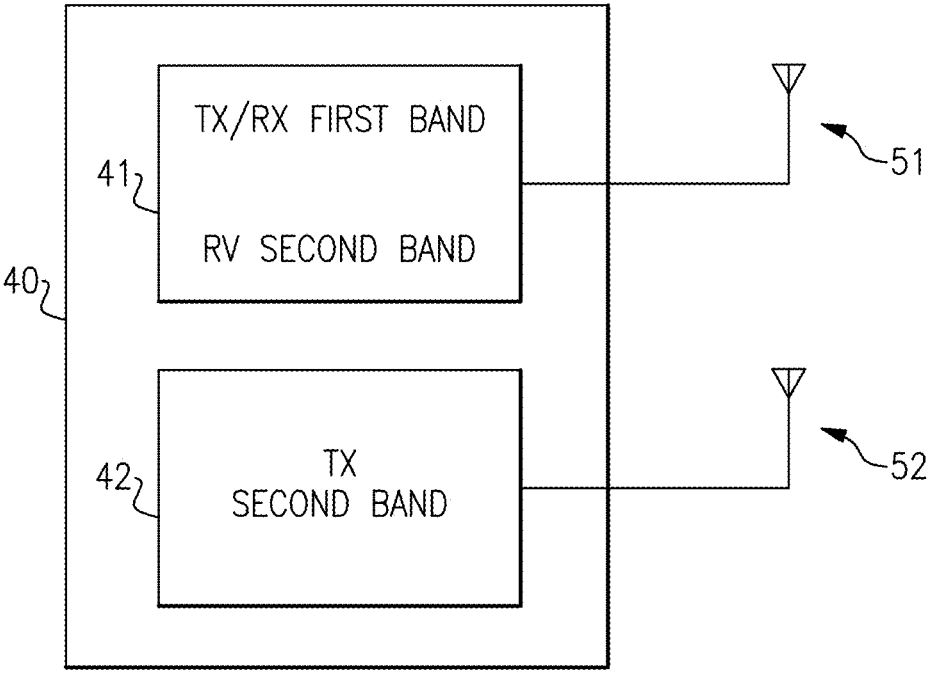
FIG. 5 is a schematic diagram of a further uplink carrier aggregation system according to aspects of the present invention.

FIG. 5 shows that in some embodiments the example UL CA system 40 can be configured to operate with first and second antennas 51, 52. A first component 41 of the UL CA system 40 can be configured to operate with the first antenna 51, and a second component 42 can be configured to operate with the second antenna 52.

FIG. 5 further shows that the UL CA system 40 can be configured such that TX and RX functionalities associated with a frequency band can be separated into the two components 41, 42 so as to improve performance. For example, the TX functionality of a second band can be implemented in the second component 42, and the RX functionality of the second band can be implemented in the first component 41. The TX/RX functionalities of the first band can be implemented in the first component 41.

In some wireless applications, the first antenna 51 is configured to facilitate TX and RX operations associated with a first band, and the second antenna 52 is configured to facilitate TX and RX operations associated with a second band. In that scenario, intermodulation between TX portions of the first and second bands results in an IM product (IMDx), for example a third-order IM product (IMD3), that overlaps with or is sufficiently close to an RX portion of the first or second bands so as to create problems for such an RX band. For the purpose of description, such an RX band or frequency can be referred to as a "victim" band or frequency. For the purpose of description, an IM product and the resulting distortion can be referred to as IMD3 since the third-order IM product is typically the most problematic. However, and as described herein, other order IM products overlapping with an RX or TX band can be addressed utilizing one or more features as described herein.

In the foregoing example, there are two sources of IMD3 in the first antenna. The first source includes the TX chain associated with the first antenna, and the second source includes leakage from the TX chain associated with the second antenna due to a finite antenna-to-antenna isolation. Similarly, there are two sources of IMD3 in the second antenna. The first source includes the TX chain associated with the second antenna, and the second source includes leakage from the TX chain associated with the first antenna, again due to a finite antenna-to-antenna isolation.

For the purpose of description, a TX band or frequency that impacts a victim band or frequency the most or in some other manner can be referred to as an "offending" band or frequency. In the above example, the RX band of the second band is a victim band and the TX band of the second band may be an offending band due to, for example, its stronger presence and closer proximity in frequency relative to the victim RX band.

Figure 6:
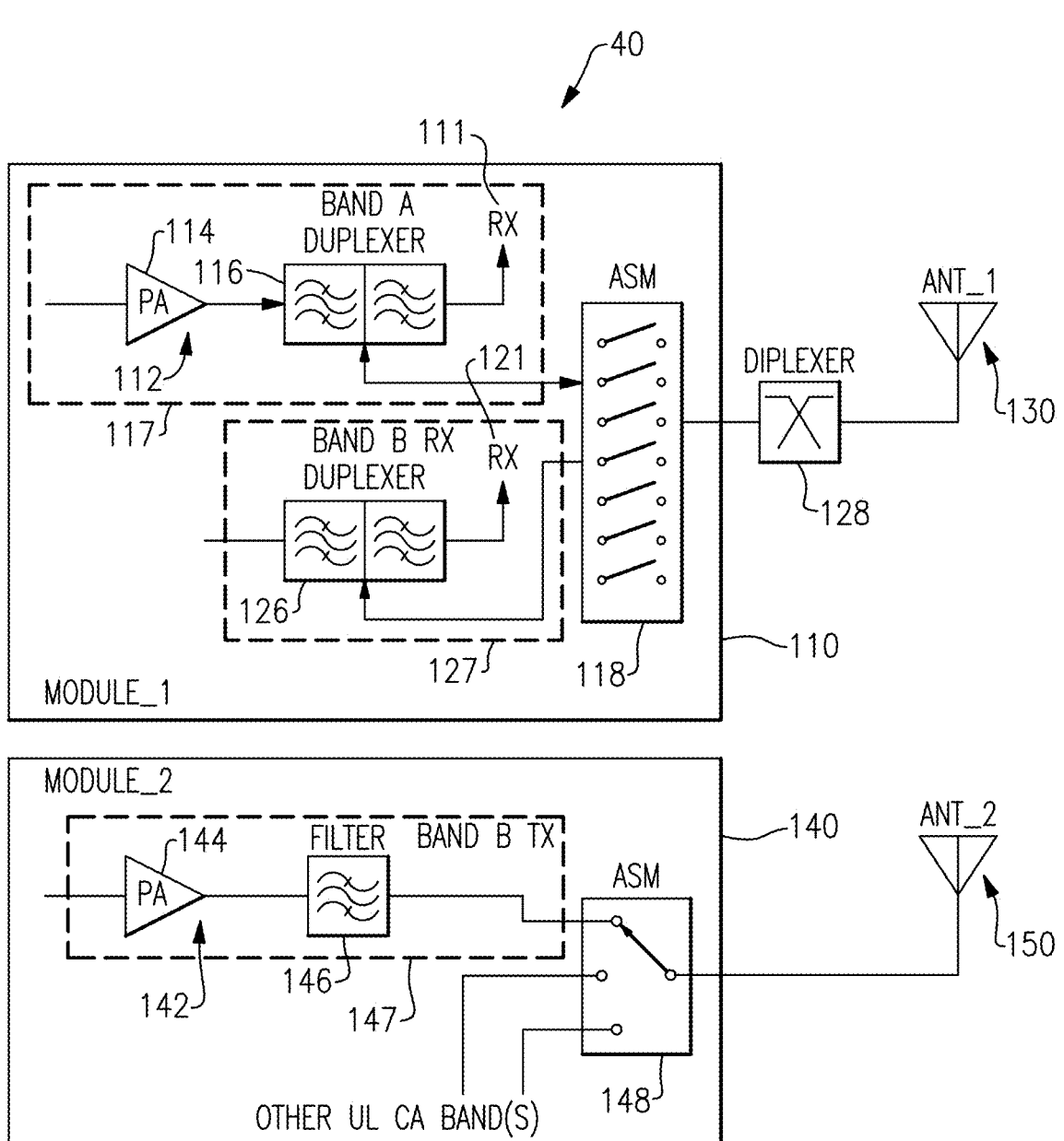
FIG. 6 is a schematic diagram of a further uplink carrier aggregation system according to aspects of the present invention.

FIG. 6 shows an example of a UL CA system 40 configured to provide UL CA functionality for a first band (Band A) and a second band (Band B). TX operations associated with the first band are facilitated by a first antenna (ANT_1) 130, and TX operations associated with the second band are facilitated by a second antenna (ANT_2) 150.

In the example of FIG. 6, RX operations associated with the first band are facilitated by the first antenna 130. Accordingly, a Band A RX/TX path 117 can include a duplexer 116 configured to filter a first amplified RF signal from a PA 114 of an amplification path 112 and route it to the first antenna 130 through an antenna switch module (ASM) 118. The duplexer 116 can be further configured to filter a first RX signal received from the first antenna 130 and route it to an RX circuit 111 for further processing.

FIG. 6 shows that in some embodiments, TX and RX paths associated with a given band can be separated such that its TX operation is performed through one antenna, and its RX operation is performed through another antenna. In the example of FIG. 6, TX operations associated with the second band (Band B) are performed through the second antenna 150, and RX operations associated with the second band (Band B) are shown to be performed through the first antenna 130.

In the example of FIG. 6, the foregoing TX operation of the second band can include a Band B TX path 147 through which a second amplified RF signal from a power amplifier (PA) 144 in an amplification path 142 is passed through a filter 146 and routed to the second antenna 150 through an ASM 148. The foregoing RX operation of the second band can include a Band B RX path 127 configured to receive a second RX signal from the first antenna 130 through the ASM 118. Such an RX signal can be passed through a filter or a duplexer 126 and be routed to an RX circuit 121 for further processing.

In the example of FIG. 6, the TX portion of the second band (Band B) may act as an offending band while the RX portion of the second band (Band B) acts as a victim band. Accordingly, the TX and RX paths associated with the second band (Band B) can be separated, such that the TX operation is performed through the second antenna 150 and the RX operation is performed through the first antenna as described above.

In the example of FIG. 6, a diplexer 128 can be provided between the first antenna 130 and the ASM 118 to, for example, facilitate simultaneous RX operations of the first and second bands through the first antenna 130. The ASM 118 associated with the first antenna 130 can include a combination of switching for TX/RX operations of the first band and switching for RX operation of the second band.

In the example of FIG. 6, the TX/RX functionalities of the first band and the RX functionality of the second band are shown to be implemented as a first module (Module_1) 110, and the TX functionality of the second band, as well as one or more UL CA functionalities, are shown to be implemented as a second module (Module 2) 140. It will be understood that other forms of functional and/or modular groupings are also possible.

As shown in FIG. 7, the UL CA system 40 may be implemented in a front-end architecture 100 that is configured to allow simultaneous processing of two RX signals and simultaneous processing of two TX signals. As also shown in FIG. 6, the example front-end architecture 100 shown in FIG. 7 comprises a primary antenna path and a secondary antenna path. The primary antenna path includes a Band A RX/TX path, which comprises a Band A RX/TX duplexer 116 and a Band A power amplifier 114, and a Band B RX path, which comprises a Band B RX duplexer 126. The primary antenna path further comprises an ASM 118, a diplexer 128, and a primary antenna 130. The secondary antenna path includes a Band B TX path, which comprises a Band B TX filter 146, a Band B power amplifier 144, an ASM 148 and a secondary antenna 150.

In the example of FIG. 7, a primary transceiver is shown to be capable of processing TX and RX signals associated with a primary band (e.g., B3), as well as one or more RX signals associated with respective RX bands (e.g., B1, B2, B25). In the example shown, the primary, or Band A, TX signal (TX1) may be a B3 TX signal, and the primary RX signal (RX1) may be a B3 RX signal. Thus, FDD operation involving such TX and RX signals can be facilitated by a B3 duplexer 116 as shown, where TX1 signal is sent through the B3 duplexer 116 for transmission, and RX1 signal is output from the B3 duplexer 116 for further processing by the primary transmitter.

From the B3 duplexer 116, the duplexed signal (double-ended arrow indicated as TX1/RX1) is shown to be routed to/from a primary antenna 130 through an antenna switch (e.g., an antenna switch module (ASM) 118). From the same antenna 130, a second RX signal (RX2) (e.g., B1 RX) is shown to be routed to a B1 duplexer 126 through the antenna switch 118. From the B1 duplexer 126, the filtered signal (RX2) is shown to be routed to the primary transceiver for further processing.

Accordingly, TX1 (e.g., B3 TX) and RX1 (e.g., B3 RX) are shown to be processed simultaneously by FDD functionality, and RX1 (e.g., B3 RX) and RX2 (e.g., B1 RX) are shown to be processed simultaneously by CA functionality. In FIG. 7, such CA functionality for RX1 and RX2 can be facilitated by the antenna switch 118.

In the example of FIG. 7, a second TX signal (TX2) (e.g., B1 TX) is shown to be generated by the second transceiver (UL-CA transceiver), amplified by a corresponding power amplifier 144 (e.g., B 1/B2 PA), and routed to a secondary antenna 150 through a B1 TX filter 146. Accordingly, simultaneous transmit operations can be performed in the front-end architecture 100 of FIG. 7 for TX1 (e.g., B3 TX) and TX2 (e.g., B1 TX) bands.

As depicted in FIG. 7, the transmitted TX2 signal (e.g., B1 TX) can leak into the primary TX/RX system. Thus, various components associated with such a primary TX/RX system can be subjected to unfiltered power of both TX1 and TX2 signals. In FIG. 7, the B1 duplexer 126 and the antenna switch 118 are examples of such components that can suffer from such TX1 and TX2 signals.

In the example configuration of FIG. 7, de-sensing of a receive operation can result from leakage of the TX2 signal. For example, RX2 (e.g., B1 RX) operation can be de-sensed due to intermodulation of TX1 and TX2 signals. In some embodiments, a third-order intermodulation distortion (IMD3) needs to be less than approximately −110 dBm to avoid de-sensing of B1 RX operation.

Referring to FIG. 8, it is noted that the B1 TX power can be reduced by antenna switch isolation, and the B1 RX power can be reduced by an IMD3. Such an IMD3 can be calculated by a formula $IMD3=P2\_TX2+2(P1\_TX1−IP3)$. By way of an example, for designs where $P1\_TX1=20$ dBm (e.g., the nominal 3GPP specification for UL-CA transmit power at the corresponding antenna), and $P2\_TX2=5$ dBm (e.g., at the TX1 antenna switch after isolation from the TX2 antenna), a typical value for IMD3 is approximately −95 dBm which is greater than the foregoing RX de-sense threshold of −110 dBm. Thus, the example configuration of FIG. 7 can result in de-sensing of, for example, the B1 RX operation.

Figure 9:
FIG. 9 is a schematic diagram of a further front-end architecture according to aspects of the present invention.
Figure 9:
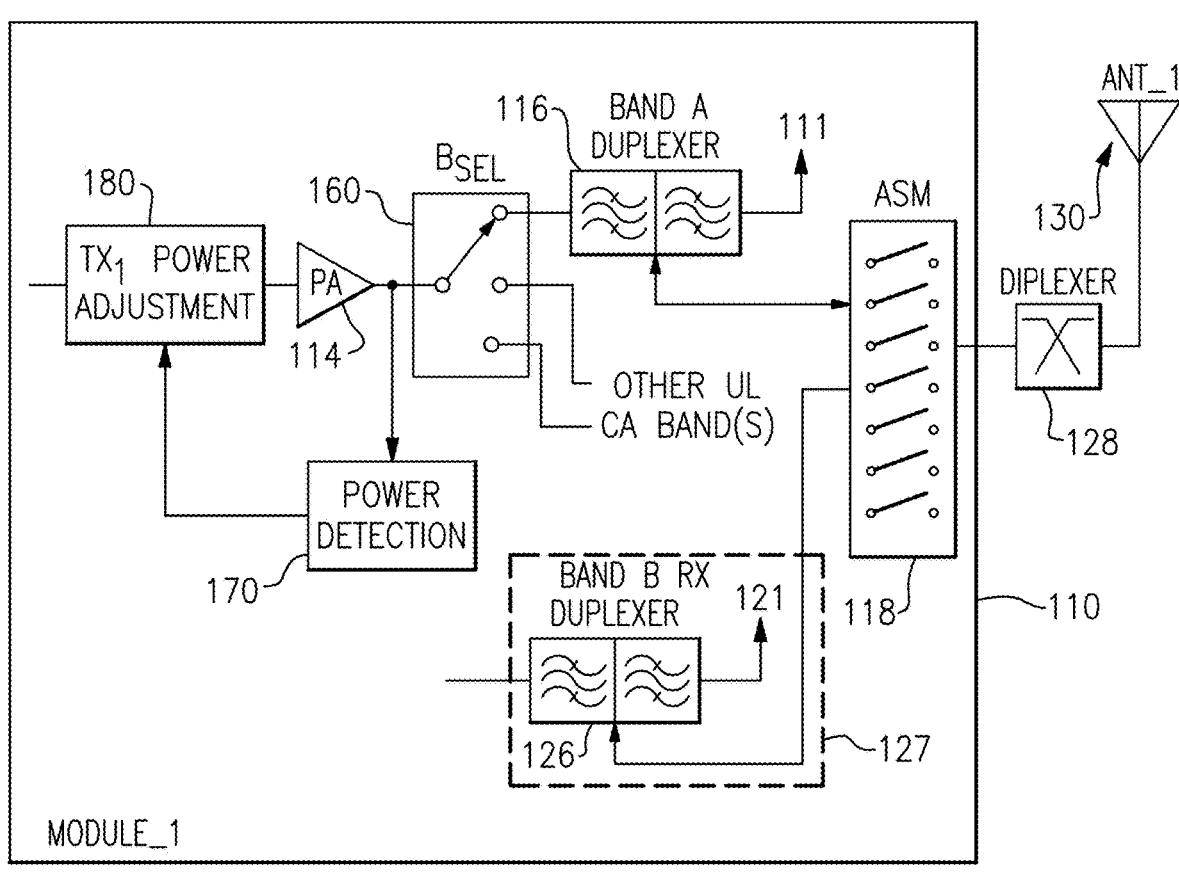
Figure 9:
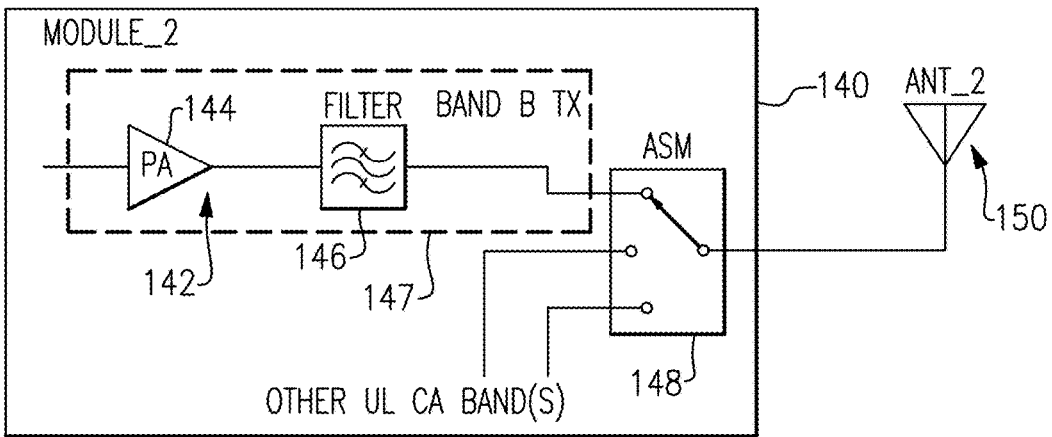

FIG. 9 is a schematic diagram of an example CA front-end architecture 100 with a power control circuit according to an embodiment of the invention.

As depicted in FIG. 9, the front-end architecture 100 comprises a first module 110 having a Band A RX/TX path that includes the power control circuit and a Band B RX path. A second module 140 includes a Band B TX path.

The power control circuit may comprise a power detection module 170, a first power adjustment module 180, and the Band A power amplifier 114.

As described above, the signal transmitted from the second antenna can leak into the primary TX/RX system, leading to intermodulation of the primary and secondary transmit signals. In embodiments of the invention, the power detection module 170 is configured to detect the forward-transmitted RF power at the primary transmit signal frequency (Band A TX) and the back-reflected RF power at the secondary transmit signal frequency (Band B TX). The reflected RF power of the Band B TX signal detected by the power detection module 170 is therefore indicative of a back-injected TX signal originating from a separate antenna system and having a different frequency to the primary transmit signal.

Accordingly, the power detection module 170 receives an indication of the RF power of a primary transmit signal, Band A TX, and a secondary transmit signal, Band B TX, that are present on the primary antenna path.

The first power adjustment module 180 receives the detected RF signal powers obtained by the power detection module 170 and calculates the optimum power levels of the Band A TX and Band B TX signals required to maximize the UL power while still providing a guaranteed IMD and emissions performance. The first power adjustment module 180 may then adjust a power level associated with power amplifier 114 based on the indication of RF power associated with the Band A TX signal. By adjusting a power level associated with amplifier 114, the output power level of the carrier aggregation circuit for the Band A TX signal can be adjusted accordingly.

Although the IMD and emissions performance may be guaranteed by adjusting the power of the Band A TX signal, it will be appreciated that the same effect may be achieved by adjusting the power of the Band B TX signal via a second power adjustment module (not shown) that is configured to adjust a power level associated with power amplifier 144. Additionally, the power of both the Band A TX signal and the Band B TX signal can be adjusted to provide the desired IMD and emissions performance.

Figure 10:
FIG. 10 is a schematic diagram of an example process performed by the power control circuit according to aspects of the present invention.
Figure 10:
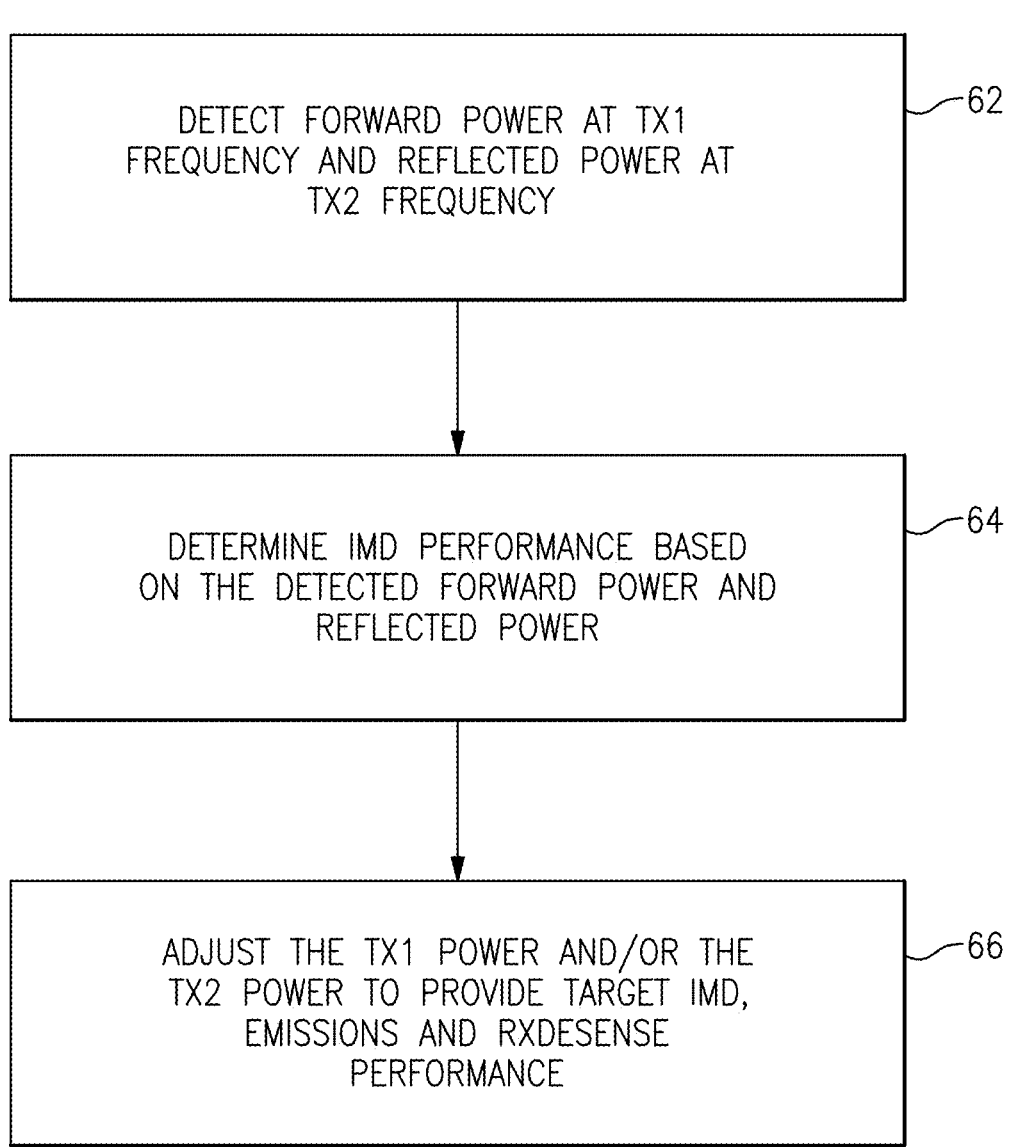

FIG. 10 is a diagram showing an example process 60 that may be performed by the power control circuit.

In a first step 62, the power control circuit detects the forward power at a first transmit frequency and a reflected power at a second transmit frequency on a primary signal path. The power of an individual RF signal may involve using a power detector coupled to any suitable directional coupler. As an example, detecting the indication of power of RF signal Band A TX can be based on an output of a directional coupler coupled between power amplifier 114 and the band-select multi-throw radio frequency switch 160. Detecting the power of different RF signals may involve a single directional coupler, or different directional couplers for each individual signal band.

In a second step 64, the power control circuit determines an IMD performance based on the detected forward power and reflected power. The calculated IMD performance may then be compared to a target IMD performance value.

In a third step 66, the power control circuit adjusts the power of the first transmit frequency and/or the second transmit frequency to provide a target value for IMD, emissions and RX DeSense performance. The power associated with each individual signal band can be adjusted may be based on the detected power associated with the respective individual signal band. For instance, the power associated with power amplifier 114 and/or power amplifier 144 can be adjusted using a control signal generated by the power control circuit based on the detected power of each respective RF signal.

Figures 11, 12:
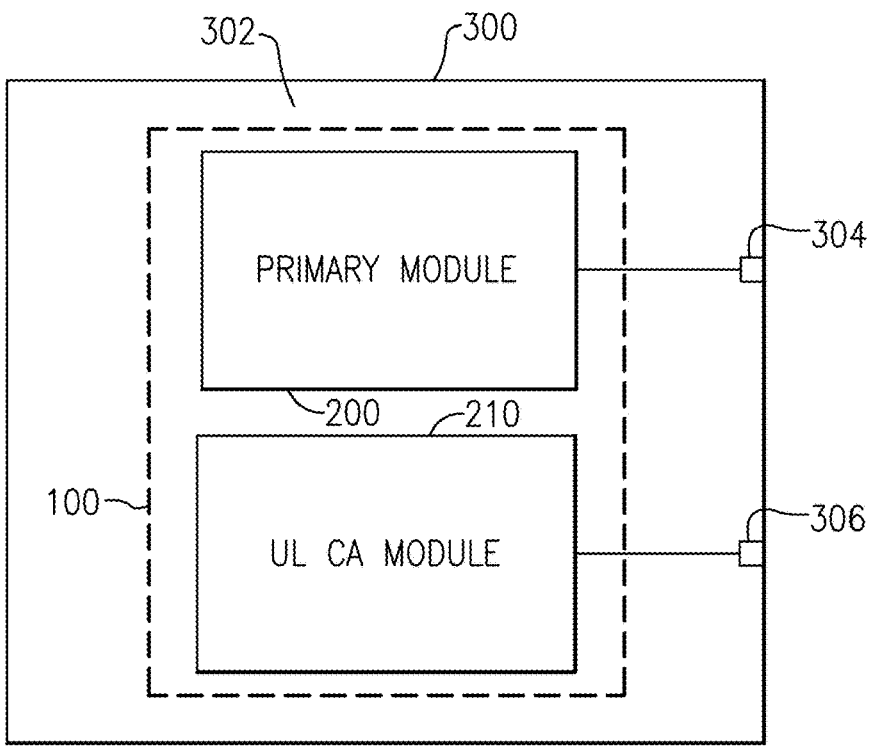
FIG. 11 is a schematic diagram of a packaged module according to aspects of the present invention.
FIG. 12 is a schematic diagram of a further packaged module according to aspects of the present invention.

FIGS. 11 and 12 show that in some embodiments, a UL CA system 100 having one or more features as described herein can be implemented in a packaged module 300. Such a module can include a packaging substrate 302 configured to receive a plurality of components.

In each of FIGS. 11 and 12, the packaged module 300 can include a first antenna port 304 and a second antenna port 306. The first antenna port 304 can be coupled to a first antenna (not shown), and the second antenna port 306 can be coupled to a second antenna (not shown).

In the example of FIG. 11, the first antenna port 304 can be connected to a first module 200 having one or more features as described herein. For example, the first module 200 can be a primary module (110) described in reference to FIGS. 6 and 9, and the second module 210 can be a UL CA module (140) also described in reference to FIGS. 6 and 9. It will be understood that each of the first and second modules 200, 210 can be implemented in a single device, as a functional assembly of a number of devices, or any combination thereof.

In the example of FIG. 12, both of the first antenna port 304 and the second antenna port 306 can be connected to a module or a component 230 having one or more features as described herein. For example, such a module (230) can include functionalities associated with a primary module (110) and a UL CA module (140) described in reference to FIGS. 6 and 9. It will be understood that the module 230 can be implemented in a single device, as a functional assembly of a number of devices, or any combination thereof.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 13:
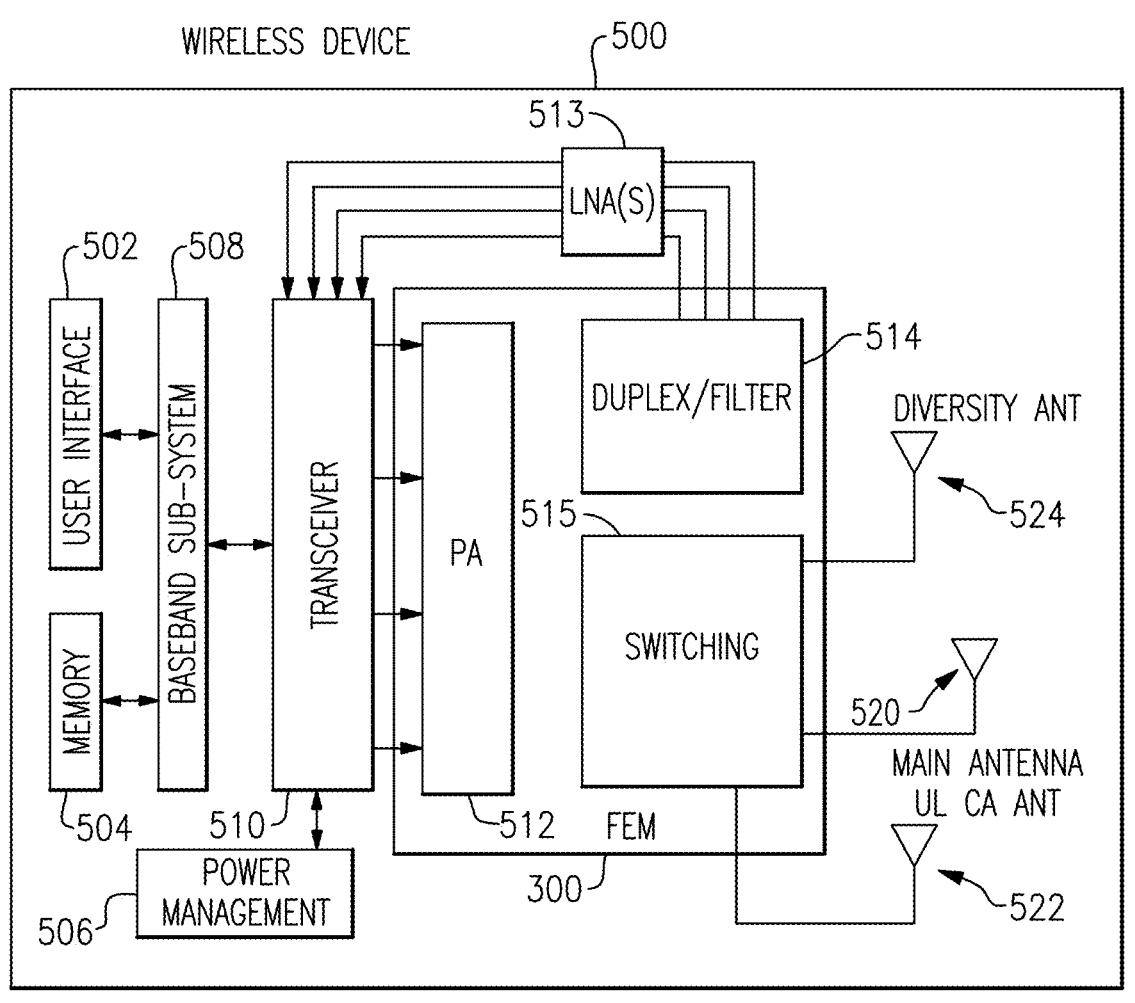
FIG. 13 is a schematic diagram of a wireless device according to aspects of the present invention.

FIG. 13 depicts an example wireless device 500 having one or more advantageous features described herein. In some embodiments, such advantageous features can be implemented in a front-end module (FEM) 300. The FEM 300 is shown to include one or more power amplifiers 512, one or more switching modules 515, and one or more duplexers and/or filters 514.

In the example of FIG. 13, the switching module 515 is shown to be coupled to three example antennas. For example, a main antenna (also referred to herein as a primary antenna) 520, a diversity antenna 524, and a UL CA antenna 522 can be provided. It will be understood that other numbers of antennas and/or antenna feeds can be implemented to facilitate one or more features of the present disclosure.

The power amplifiers 512 can receive their respective RF signals from a transceiver 510 that can be configured and operated to generate RF signals to be amplified and transmitted, and to process received signals. The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |

TABLE 1-continued

| Band | Mode | Tx Frequency Range (MHz) | Rx Frequency Range (MHz) |
|------|------|--------------------------|--------------------------|
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

Frequency bands that operate in a frequency division duplex (FDD) mode perform simultaneous transmit (Tx) and receive (Rx) operations via different frequencies. For example, Band 3 operates with transmit signals having frequencies of approximately 2500 MHz to approximately 2570 MHz, and operates with receive signals having frequencies of approximately 2620 MHz to approximately 2690 MHz. This is typically accomplished by the use of a duplexer, which combines Tx and Rx paths into a common terminal. By contrast, frequency bands that operate in a time division duplex (TDD) mode have a single frequency band that is utilized for both Tx and Rx operations. For example, Band 40 operates with a single frequency band of approximately 2300 MHz to approximately 2400 MHz.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A system configured for uplink carrier aggregation comprising:
   a first signal path configured to transmit signals in a first frequency band;
   a second signal path configured to receive signals in a second frequency band;
   a third signal path configured to transmit signals in the second frequency band; and
   a power control circuit coupled to the first signal path, the power control circuit being configured to measure a forward power level in the first signal path associated with the first frequency band and a reflected power level in the first signal path associated with the second frequency band, and to adjust a power of a signal transmitted by the first signal path in the first frequency band and/or a power of a signal transmitted by the third signal path in the second frequency band.

2. The system of claim 1 wherein the power control circuit includes a power detector module configured to measure the forward power level and the reflected power level.

3. The system of claim 1 wherein the power control circuit includes an adjustment module configured to adjust the power of the signals to be transmitted in the first frequency band and/or the second frequency band.

4. The system of claim 1 further including a first adjustment module configured to adjust the power of the signals to be transmitted in the first frequency band and a second adjustment module configured to adjust the power of the signals to be transmitted in the second frequency band.

5. The system of claim 1 wherein the power control circuit includes a first power amplifier that amplifies the signal to be transmitted in the first frequency band, and the power control circuit is configured to adjust a power level of the first power amplifier.

6. The system of claim 1 wherein the power control circuit includes a first power amplifier that amplifies the signal to be transmitted in the first frequency band and a second power amplifier that amplifies the signal to be transmitted in the second frequency band.

7. The system of claim 1 wherein the power control circuit includes a first power amplifier that amplifies the signal to be transmitted in the first frequency band and a second power amplifier that amplifies the signal to be transmitted in the second frequency band, the power control circuit being configured to adjust the power of the transmitted signals in the first frequency band and/or the second frequency band by adjusting a power level associated with the respective first or second power amplifier.

8. The system of claim 1 wherein the first signal path is coupled to a first antenna port via a diplexer.

9. The system of claim 1 wherein the second signal path is coupled to a first antenna port via a diplexer.

10. The system of claim 1 wherein the third signal path is coupled to a second antenna port.

11. The system of claim 1 wherein the first signal path includes a transmit path for processing signals in the first frequency band, the transmit path including a first power amplifier, a band select switch, a first duplexer, and an antenna switch module.

12. The system of claim 1 wherein the second signal path includes a receive path for processing signals in the second frequency band, the receive path including a second duplexer, and an antenna switch module.

13. The system of claim 1 wherein the third signal path includes a transmit path for processing signals in the second frequency band, the transmit path including a second power amplifier, a filter, and a second antenna switch module.

14. The system of claim 1 wherein the first frequency band is a first frequency division duplex radiofrequency band and the second frequency band is a second frequency division duplex radiofrequency band.

15. The system of claim 1 wherein the first frequency band includes frequency signals between approximately 1,710 MHz to 1,785 MHz and between approximately 1,805 MHz to 1,880 MHz.

16. The system of claim 1 wherein the second frequency band includes frequency signals between approximately 1,920 MHz to 1,980 MHz and between approximately 2,110 MHz to 2,170 MHz.

17. The system of claim 1 further comprising a second power control circuit coupled to the third signal path, the second power control circuit being configured to measure a reflected power level in the third signal path associated with the first frequency band and a forward power level in the third signal path associated with the second frequency band, and to adjust a power level of a power amplifier of the third signal path.

18. A radio-frequency front-end module comprising:
   a packaging substrate configured to receive one or more components;
   a first signal path configured to transmit signals in a first frequency band;
   a second signal path configured to receive signals in a second frequency band;
   a third signal path configured to transmit signals in the second frequency band; and
   a power control circuit coupled to the first signal path, the power control circuit being configured to measure a power of a transmitted signal in the first signal path associated with the first frequency band and a power of a received signal in the first signal path associated with the second frequency band, and to adjust a power of of a signal transmitted by the first signal path in the first frequency band and/or a power of a signal transmitted by the third signal path in the second frequency band.

19. A wireless device comprising:

a first transceiver and a second transceiver;

a first antenna and a second antenna; and a radio-frequency front-end module including a first signal path configured to transmit signals in a first frequency band to the first antenna, a second signal path configured to receive signals in a second frequency band, a third signal path configured to transmit signals in the second frequency band to the second antenna, and a power control circuit coupled to the first signal path, the power control circuit being configured to measure a forward power in the first signal path associated with the first frequency band, measure a reflected power in the first signal path associated with the second frequency band, and to adjust a power of a signal transmitted by the first signal path in the first frequency band and/or a signal transmitted by the third signal path in the second frequency band.

20. A method of providing uplink carrier aggregation comprising:

measuring, with a power control circuit, a forward power level associated with a first frequency band in a first signal path and a reflected power level associated with a second frequency band in the first signal path;

determining, with the power control circuit, a calculated performance value based on the forward power level and the reflected power level;

comparing, with the power control circuit, the calculated performance value with a target performance value; and adjusting, with the power control circuit, a power of a signal transmitted by the first signal path based on the comparing.

\* \* \* \* \*